UNITED STATES PATENT OFFICE.

EDWARD ALFRED PATERSON, OF PORT ARTHUR, ONTARIO, CANADA.

HYDROUS ALKALI-METAL SILICATE AND METHOD OF PRODUCING IT.

1,111,918.

Specification of Letters Patent. Patented Sept. 29, 1914.

No Drawing. Application filed December 17, 1913. Serial No. 807,358.

*To all whom it may concern:*

Be it known that I, EDWARD A. PATERSON, a subject of the King of Great Britain, residing at Port Arthur, in the Province of Ontario and Dominion of Canada, have invented certain new and useful Improvements in Hydrous Alkali-Metal Silicates and in Methods of Producing Them, of which the following is a specification.

The object of this invention is to provide a dry alkali metal silicate in a comminuted form containing a relatively large percentage of silica and sufficient alkali and contained water to render the silicate readily soluble in cold water or in water at ordinary temperatures.

Silica is largely used in many industries, but for most purposes it must be furnished in such form that it can be dissolved and combined with other ingredients. If furnished in the form of an alkali metal silicate having a large percentage of alkali it is readily soluble but the alkali is much more expensive than the silica and as the alkali is often not useful in the composition produced, it is wasted and a large amount of the material paid for is thus lost. If the alkali metal silicate contains a large percentage of combined water the compound is also readily soluble, but in this form the material is usually in a viscous condition, not easy to handle and not readily soluble, and besides is expensive to transport owing to the large percentage of water which it contains on which, of course, freight charges must be paid and other charges such as for barreling, etc., must be met.

According to my invention I provide an alkali metal silicate containing a large percentage of silica and a relatively small percentage of alkali and also a relatively small percentage of combined water and the mixture in in a powdered form which need not be barreled, can be easily handled and readily dissolved.

The alkali metal silicate which I produce according to my invention has the general formula, $$Na_2O n SiO_2 n H_2O$$

*n* before the $SiO_2$ radical indicating an indefinite number but more than one and preferably within the limits 2 to 4, while before $H_2O$ it has a wider limit. In any event, however, the compound contains much more silica than alkali and a low percentage of water molecularly combined. The final product is in a dry powdered form and is permanent under ordinary conditions. It may be packed in cheap containers such as paper bags, will not become lumpy and will not absorb moisture from the atmosphere. I have found by long continued trial that the silicate should be so treated as to contain from 12% to 19% of water.

In practising my process I preferably take solid sodium silicate glass as found in the market and dissolve it in the usual way. The silicate should be one containing as much silica as possible and I subject the solution to a drying treatment at a comparatively low temperature and under a partial vacuum.

Any suitable drier may be employed, such as the Kestner evaporator, and the treatment is so conducted as to prevent the formation of bubbles which would imprison some of the vapors and allow some parts of the material to be dried more than others, thus failing to obtain uniformity in the product as I do not desire to obtain completely dehydrated material, or material in which some of the particles are completely dehydrated, since such material or particles may not be readily dissolved.

The first evaporation or drying is preferably carried on under reduced pressure at a relatively low temperature, say 60° to 70° C. until the total content of water is reduced to say from 30% to 35% of the whole, when the mass is in a practically solid condition. By using this low temperature and pressure the formation of the objectionable bubbles above referred to is prevented. I then coarse grind the material to produce as nearly as possible substantially uniform grains which will stay on say 20-mesh sieves. The ground material is then subjected to a second drying treatment at a temperature, of say 60° to 70° C., during which treatment the material is thoroughly stirred or agitated until the water is reduced to approximately from 24% to 25%. After this the material is ground fine until it will pass sieves of say 100-mesh and then stirred or agitated and dried at a temperature of say 100° to 120° C.

until the water content is reduced to between 12% and 19%, preferably to 12%, a little more or less, depending largely upon the character of the silicate employed.

Instead of starting with sodium silicate glass, I may use colloidal silicate which contains from 60% to 65% water and air dry it until the water content is reduced to from 25% to 30% and then treat it in the manner above described, i. e., coarse grind it, dry it, fine grind and again dry until the water content is reduced to approximately between 12% and 19%.

The formula hereinbefore given for the material produced by my process is by way of example only. It may vary somewhat as much depends on the nature of the silicate first treated and to variations in the drying and grinding. The final product may also be stated by the following typical formula:

$$Na_2O4SiO_2 2H_2O$$

In this formula the water content is nearly 11% as is indicated by the following:

$$2\times 23+16+4(28+2\times 16)+2(2+16)=338$$
$$36\div 338=.1065=\text{approximately } 11\%.$$

I have found that if the percentage of water be reduced much below 12% the solution in cold water is difficult. If the water content is reduced to say 2% the material is soluble in hot water only.

The material produced in the manner described is in the form of a dry powder which keeps dry and powdery under all usual conditions of storage and transportation. It may be packed in cheap containers, does not lump or harden and does not absorb moisture from the atmosphere.

While I have stated that the material is soluble in cold water, it will be understood that it may be dissolved in warm or hot water also, but of course cold water or water at ordinary temperatures is usually most available.

I have referred in the foregoing specification to alkali silicate broadly, but I prefer to use sodium silicate. The product may be neutral or alkaline, but in any event it is easily soluble in either hot or cold water.

I claim as my invention:

1. A substantially homogeneous, dry, comminuted alkali metal silicate, dried under low pressure, having a large percentage of silica and having alkali and contained water, sufficient, in view of its having been dried under low pressure, to make it soluble in cold water.

2. A substantially homogeneous, dry, alkali metal silicate, dried under low pressure, easily soluble in cold water, in which silicate the molecularly combined water is approximately from twelve per cent. to nineteen per cent.

3. A substantially homogeneous, dry, comminuted, alkali metal silicate dried at low temperature and under low pressure, having a large percentage of silica, and having alkali and contained water, sufficient, in view of its having been dried at low temperature and under low pressure, to make it soluble in cold water.

4. The method of producing a dry powdered hydrous alkali metal silicate, which consists in incompletely drying an alkali metal silicate at a comparatively low temperature and under a partial vacuum to reduce the water content and to produce a solid mass, next coarse grinding the material thus obtained, further drying the coarse ground mixture, then regrinding the material to reduce it to a fine powder and finally drying until the water content is reduced to an amount which in the hydrous alkali metal silicate produced is sufficient only in connection with the alkali present to render the silicate readily soluble in cold water.

5. The method of producing a dry powdered hydrous alkali metal silicate, which consists in incompletely drying an alkali metal silicate to reduce the water content and to produce a solid mass, next coarse grinding the material thus obtained, further drying the coarse ground mixture, then regrinding the material to reduce it to a fine powder and finally drying until the water content is reduced to an amount which in the hydrous alkali metal silicate produced is sufficient only in connection with the alkali present to render the silicate readily soluble in cold water.

6. The method of producing a dry powdered hydrous alkali metal silicate, which consists in incompletely drying an alkali metal silicate to reduce the water content and to obtain a solid mass and then repeatedly grinding and further drying such silicate until the water content is reduced to between approximately from 12% to 19% and the material is in the form of a dry powder.

7. The method of producing a dry powdered hydrous alkali metal silicate, which consists in repeatedly drying and grinding a solution of an alkali metal silicate until the water is reduced to between approximately from 12% to 19% and the material is in the form of a dry powder.

8. The method of producing a dry powdered hydrous alkali metal silicate, which consists in incompletely drying an alkali metal silicate until it attains a solid form in which the particles are uniformly hydrated, coarse grinding such material, further drying the granular mixture to obtain a uniformly hydrated product, then grinding the grains to reduce them to a fine powder and then drying the powder to obtain a dry powdery alkali metal silicate low in percentage of combined water.

9. The method of producing a dry powdered hydrous alkali metal silicate soluble in cold water, which consists in incompletely drying under reduced pressure a solution of an alkali metal silicate until it becomes solid and then repeatedly grinding and further drying the material until it is reduced to a fine powder low in percentage of combined water but in a powderly form and readily soluble in cold water.

In testimony whereof, I have hereunto subscribed my name.

EDWARD ALFRED PATERSON.

Witnesses:
LEWIS T. PAYNE,
ELSIE SCHMITT.